United States Patent
Lozyniak et al.

(10) Patent No.: US 6,196,796 B1
(45) Date of Patent: Mar. 6, 2001

(54) HIGH TORQUE ACTUATION SYSTEM FOR AN ACTIVE ROTOR CONTROL SYSTEM

(75) Inventors: Steven A. Lozyniak, South Windsor; Peter Frederick Lorber, Coventry; Fred W. Kohlhepp, Hamden; Lee A. Hoffman, Vernon; Robert Morton, Stafford Springs; Richard B. Ferraro, Northford, all of CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 09/296,737

(22) Filed: Apr. 22, 1999

(51) Int. Cl.$^7$ ...................................................... B64C 9/00
(52) U.S. Cl. ............................................. 416/24; 416/158
(58) Field of Search ................................. 416/23, 24, 158; 92/122

(56) References Cited

U.S. PATENT DOCUMENTS

| | | | |
|---|---|---|---|
| 2,625,997 | 1/1953 | Doak | 170/160.13 |
| 3,020,008 | * 2/1962 | Rumsey | 244/85 |
| 3,089,668 | * 5/1963 | Goodall | 244/12 |
| 3,529,417 | 9/1970 | Knight | 60/26.1 |
| 4,324,530 | 4/1982 | Fradenburgh et al. | 416/228 |
| 4,464,980 | 8/1984 | Yoshida | 92/34 |
| 4,825,754 | * 5/1989 | Devaud et al. | 92/122 |
| 5,320,491 | 6/1994 | Coleman et al. | 416/24 |
| 5,409,183 | 4/1995 | Gunsallus | 244/17.13 |
| 5,588,800 | 12/1996 | Charles et al. | 416/24 |
| 5,639,215 | 6/1997 | Yamakawa et al. | 416/23 |
| 5,711,651 | 1/1998 | Charles et al. | 416/24 |

OTHER PUBLICATIONS

Abstract entitled Individual Blade Control Project, pp. 1–2, http://halfdome.arc.nasa.gov/~aarweb/research/ibc.html, dated Jul. 2, 1997.

Abstract entitled "Aeroelastic and Dynamic Rotor Reponse with On–Blade Elevon Control", page one, http://halfdome.arc.nasa.gov/publications/abstracts/abs14.html, dated approximately Sep., 1998.

Abstract entitled "Hover Testing of a Small–Scale Rotor with On–Blade Elevons", one page, http://halfdome.arc.nasa.gov/publications/abstracts/abs12.html., dated approximately Apr., 1997.

* cited by examiner

Primary Examiner—Edward K. Look
Assistant Examiner—Ninh Nguyen
(74) Attorney, Agent, or Firm—Seidel Gonda, Lavorgna & Monaco, PC

(57) ABSTRACT

An actuation system for pivoting a flap on a helicopter rotor blade to reduce the interaction of the blade with the preceding blade vortex. The actuation system includes a fluid supply which is connected to first and second fluid supply lines. The fluid supply lines convey flows of pressurized fluid from the fluid supply to an actuator. The actuator includes a housing mounted within the rotor blade and having a channel formed in it. A butterfly shaft is pivotally mounted within the channel and has laterally extending arms which separate the channel into four lobes. A first port connects the first fluid supply line with two diametrically opposed lobes in the channel. A second port connects the second fluid supply line with the other two diametrically opposed lobes in the channel. A torque coupling is attached to the butterfly shaft and engaged with the flap such that rotation of the torque coupling produces concomitant rotation of the flap. The pressurization of the first fluid supply line causes the torque coupling to rotate in a first direction. The pressurization of the second supply fluid line causes the torque coupling to rotate in the opposite direction.

13 Claims, 8 Drawing Sheets

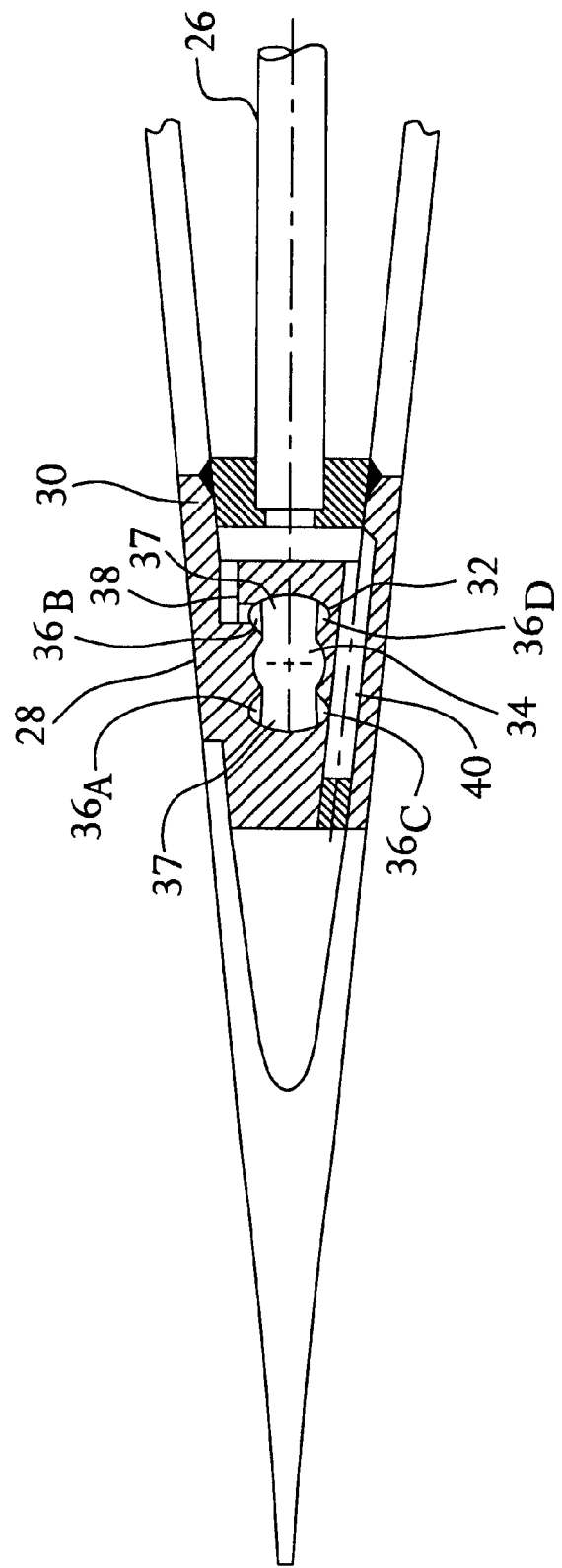

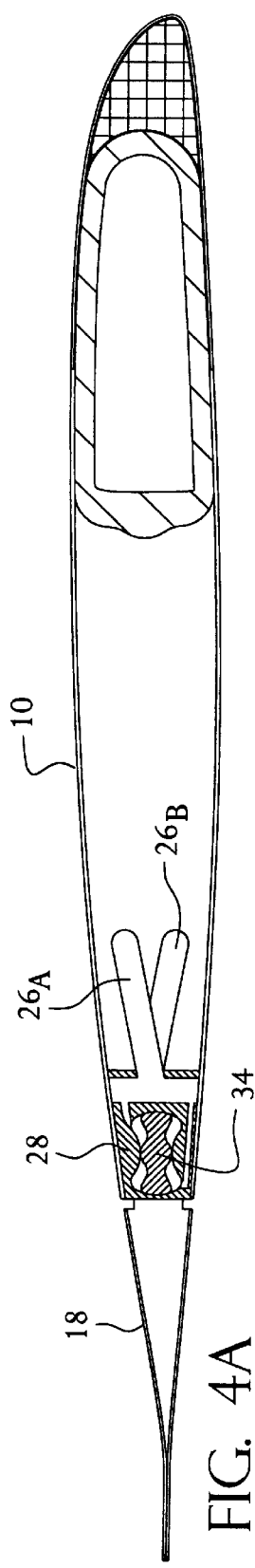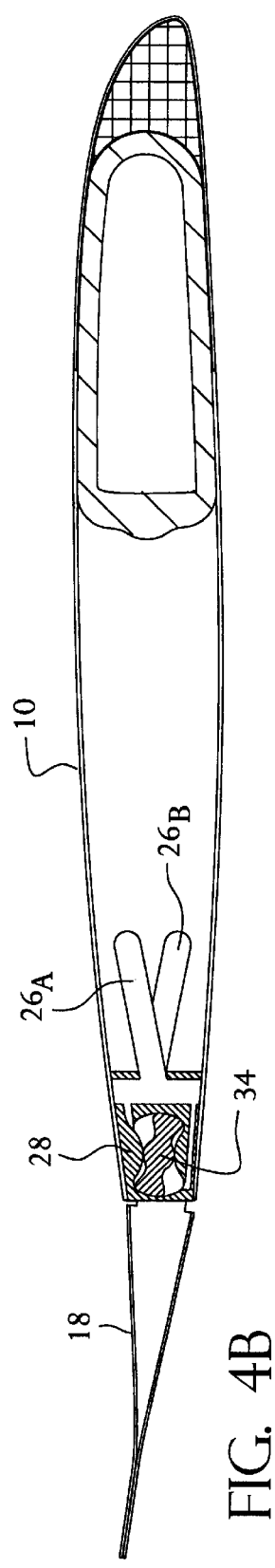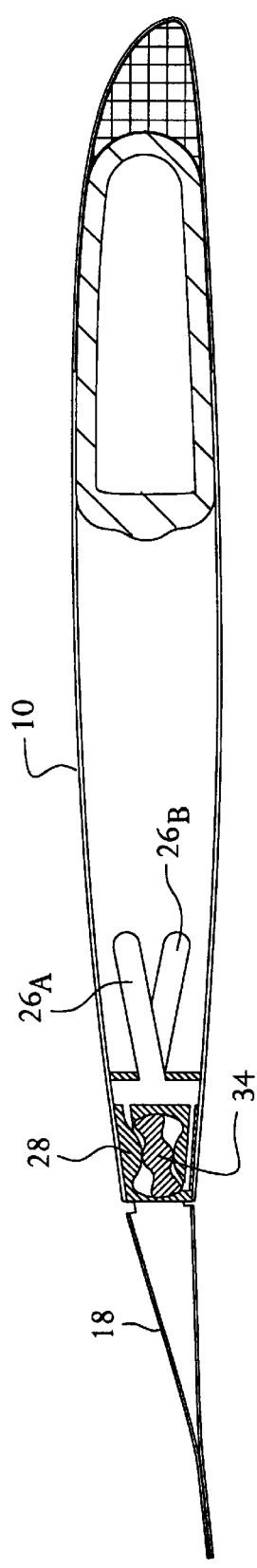

HIGH TORQUE ACTUATION SYSTEM FOR AN ACTIVE ROTOR CONTROL SYSTEM

FIELD OF THE INVENTION

The present invention relates to an actuation system for an aircraft and, more particularly, to an improved actively controlled actuator for controlling the flap angle in a helicopter rotor blade.

BACKGROUND OF THE INVENTION

Helicopter main rotor lift and rotor driving torque produce reaction forces and moments on the helicopter main gearbox. In addition to the primary flight loads, the aircraft is also subjected to vibratory loads originating from the main rotor system. These vibratory loads produce vibrations and noise within the aircraft that are extremely discomforting and fatiguing to the passengers.

One vibratory load that is of particular concern results from the interaction of the rotor blades with blade vortices developed by the preceding blades during rotation. As the rotor blade rotates, the air flows passing over and under the blade combine downstream from the trailing edge creating a vortex. During normal flight modes, the blade vortices do not cause any particular problem. However, in certain instances, such as when the aircraft is descending, the trailing blade contacts the blade vortex generating an impulsive noise or slap. This contact with the vortex also creates a vibration within the rotor system that transfers into the cabin. These vibrations can be upwards of 5/rev (i.e., 5 times per revolution of the rotor system). The noise and vibrations generated by the blade interaction with the vortices results in passenger and crew discomfort.

Blade vortex interaction also generates an external noise signature which can be easily detected at long range, increasing the aircraft's vulnerability when in a hostile environment. With the increasing use of helicopters for night reconnaissance missions, it is desirable to minimize the external noise signature of the aircraft.

Many attempts have been made over the years to alleviate or reduce blade vortex interactions. A considerable amount of those attempts have been directed toward passive type systems wherein the blade is designed to weaken the vortex at the blade tip. See, for example, U.S. Pat. No. 4,324,530 which discloses a rotor blade with an anhedral swept tapered tip which reduces the intensity and shifts the location of the tip trailing edge vortex so as to reduce the occurrence of blade vortex interactions.

While passive solutions have provided some reduction in blade vortex interaction, those solutions also tend to negatively impact the flight characteristics of the rotor blade.

Active rotor control systems have recently been proposed to counteract blade vortex interactions. These systems are typically designed to change the motion of the rotor blade to miss the blade vortex or cut the vortex differently so as to reduce contact with the blade vortex. One of these systems is called higher harmonic blade pitch control wherein the blade pitch is controlled to reduce the vortex at the blade tip. While the reduced blade tip vortex does lead to lower noise from blade vortex interaction, the change in blade pitch also reduces the aerodynamic characteristics for the entire blade.

Another active control system is discussed in U.S. Pat. No. 5,588,800. This active control system is mounted within a helicopter rotor blade and includes actuatable flaps on the rotor that are controlled to reduce the blade vortex interaction. An actuator is used to control the movement of the flaps and can be either mechanical, electrical, pneumatic, or hydraulic. U.S. Pat. No. 5,639,215 discloses a similar actuatable flap assembly. In this assembly, the actuator is a mechanical actuator that is either a push-rod type device, a linkage, or a servo-motor driven rack.

Although the prior art systems for actively controlling the rotor blade interactions with the blade vortex are empirically better than the passive systems described above, these prior art systems do not address the realistic problems associated with mounting an actuation system within a rotor blade to control the flaps in the desired manner.

A need, therefore, exists for an improved actuation system for use in an active rotor control system to control flaps on a rotor blade for improving the blade's aerodynamic performance while reducing noise generating by blade vortex interactions.

SUMMARY OF THE INVENTION

The present invention relates to an actuator for actuating a flap mounted on a trailing edge of a helicopter rotor blade. The actuator is adapted to be connected to a first and second fluid supply lines. The fluid supply lines provide first and second flows of pressurized fluid from a fluid supply. The actuator includes a housing which is adapted to be mounted within the rotor blade. The housing has a channel formed within it. A butterfly shaft is pivotally mounted within the channel. The butterfly shaft has laterally extending arms which separate the channel into four lobes.

A first port formed within the housing is adapted to receive a flow of fluid from the first fluid supply line. The first port is in fluid communication with two diametrically opposed lobes in the channel.

A second port formed within the housing is adapted to receive a flow of fluid from the second fluid supply line. The second port is in fluid communication with the other two diametrically opposed lobes in the channel.

A torque coupling is preferably attached to the butterfly shaft and adapted to engage with a flap on the rotor blade such that rotation of the torque coupling produces concomitant rotation of the flap. The torque coupling rotates in a first direction when the first port receives pressurized fluid, and rotates in the opposite direction when the second port receives pressurized fluid.

An actuation system that includes the above described actuator is also disclosed for actuating a flap on a helicopter rotor blade.

The foregoing and other features and advantages of the present invention will become more apparent in light of the following detailed description of the preferred embodiments thereof, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

FIG. 3 is an enlarged view of one embodiment of a butterfly actuator used to actuate a flap in one embodiment of the invention.

FIG. 4A is a cross-sectional view of a helicopter rotor blade incorporating a butterfly actuator for actuating a flap according to the present invention.

FIG. 4B is a cross-sectional view of the helicopter rotor blade in FIG. 4A illustrating the flap in an upwardly deflected position.

FIG. 4C is a cross-sectional view of the helicopter rotor blade in FIG. 4A illustrating the flap in a downwardly deflected position.

DETAILED DESCRIPTION OF THE PREFERRED EMBODIMENTS

While the invention will be described in connection with one or more preferred embodiments, it will be understood that it is not intended to limit the invention to those embodiments. On the contrary, it is intended that the invention cover all alternatives, modifications and equivalents as may be included within its spirit and scope as defined by the appended claims.

Certain terminology is used herein for convenience only and is not be taken as a limitation on the invention. Particularly, words such as "upper," "lower," "left," "right," "horizontal," "vertical," "upward," and "downward" merely describe the configuration shown in the figures. Indeed, the components may be oriented in any direction and the terminology, therefore, should be understood as encompassing such variations unless specified otherwise.

Figure 1:
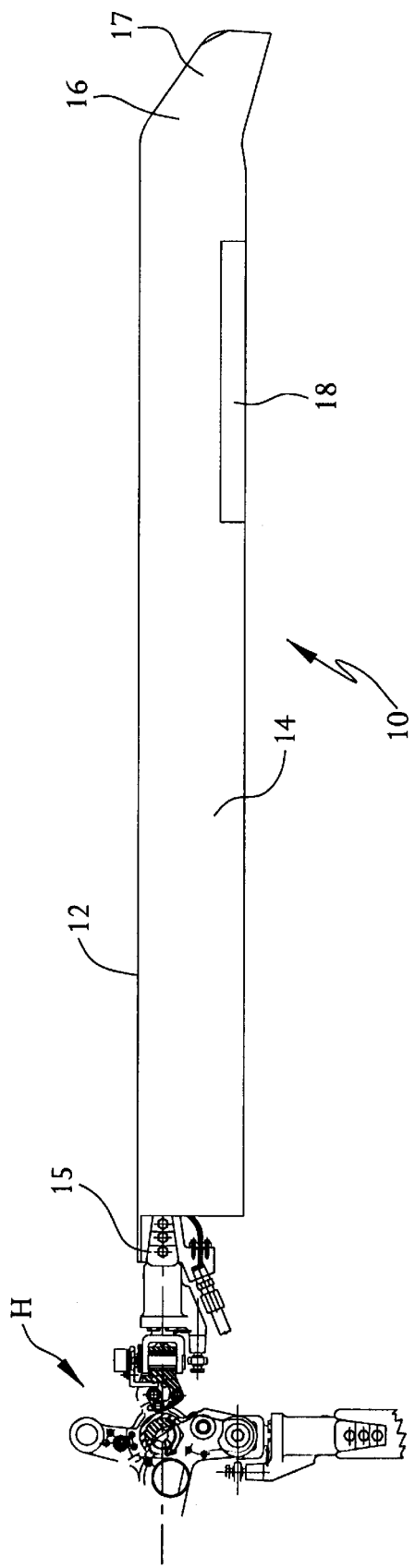
FIG. 1 is a plan view of a helicopter rotor blade incorporating an actuatable flap according to the present invention.

Referring now to the drawings, wherein like reference numerals illustrate corresponding or similar elements throughout the several views, FIG. 1 illustrates a rotor blade 10 for a helicopter. The rotor blade 10 includes a leading edge 12 and a trailing edge 14. The blade 10 is attached at its root end 15 to a helicopter hub H and rotated in conjunction therewith about a rotational axis. The blade 10 includes a tip end 16 which is located at the radially outermost point on the blade. The tip end 16 may include a tip cap 17. At least one flap 18 is mounted to the trailing edge 14 of the blade 10 so as to be articulatable with respect to the trailing edge 14. As shown, the flap 18 may be located within a recess in the trailing edge 14. Alternatively, the flap 18 may be located aft of the trailing edge 14 and extent all or partway along the length of the trailing edge 14. Moreover, there may be several flaps 18 mounted to the rotor blade 10 that can be articulated either independently or concurrently for controlling blade vortex interactions.

Figure 2:
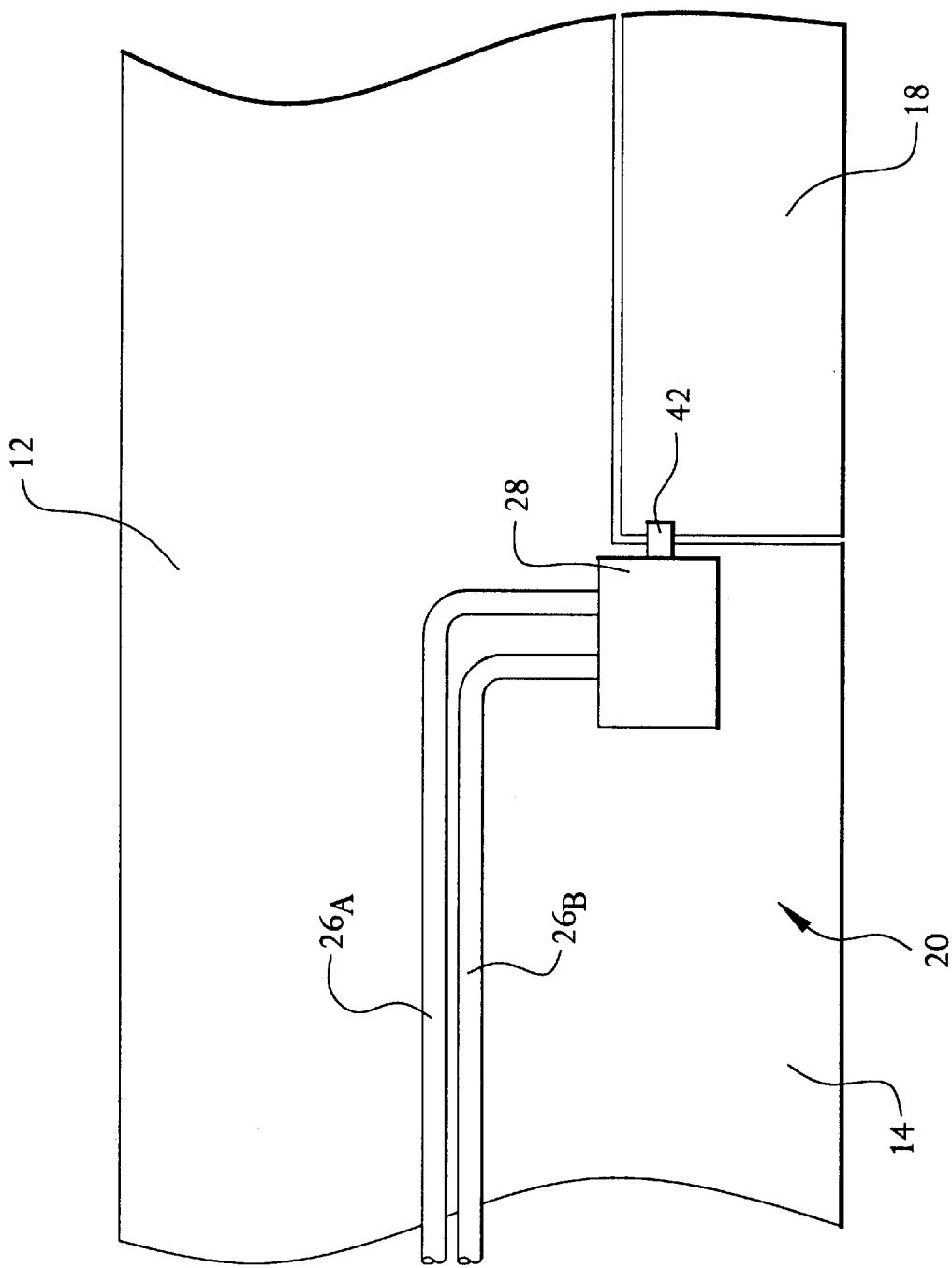
FIG. 2 is a top schematic view of a portion of a rotor blade illustrating one embodiment of the flap actuation system according to the present invention.

Referring now to FIG. 2, a schematic plan view of the rotor blade 10 is shown illustrating the actuation system 20 according to one embodiment of the present invention. As discussed above, there have recently been several attempts made at designing an actuation system for controlling flaps on rotor blades. The present invention requires an actuation system that can operate with any rotor system operating at about 2/rev to about 5/rev. The actuation system should be capable of providing flap angular control of about ±10° at approximately 30 cycles/second (Hz) at 5/rev. Furthermore, the actuation system must be capable of providing a sufficient amount of force to overcome the air loads acting on the flap during normal flight. For example, in order to actuate a 69 inch long flap, a torque of 864 in-lbs must be generated to overcome the air loads on the blade.

To meet these design requirements, the present invention incorporates an actuation system 20 that includes a fluid actuator. Other types of systems, such as those disclosed in the prior art, were considered but were determined not to be sufficient for use in a full scale rotor system. For example, although an electromechanical actuator (such as a voice coil) or a solid state actuator (such as a piezoelectric) could be used to control flap motion, currently available devices cannot meet the full scale rotor requirements. These requirements include providing a sufficient amount of deflection (e.g., ±10°) and torque, while minimizing weight and staying within the blade airfoil contour to avoid creating an aerodynamic drag penalty.

The actuation system 20 includes a fluid supply (not shown in FIG. 2), which can include, for example, a pump and a fluid source. While a pneumatic system could be used, it is not preferred since air is compressible. Also, a pneumatic system capable of producing the 2000–3000 psi would have serious safety and operational issues. Hydraulic fluid is more preferred since its compressibility is less than air and, thus, provides better control over the actuator motion. The fluid supply is, in one embodiment, located externally from the rotor blade 10. Preferably a single fluid supply provides a pressurized fluid medium to the actuation systems 20 located in all the blades 10. The fluid supply is preferably located within the rotor hub H and rotates in conjunction with the rotor blades 10. The fluid supply can be connected through an electrical control line to a power source and/or a controller for controlling the fluid supply. The power source and/or controller may be located within the rotor hub or can be located within the aircraft with the power and control commands being transferred from the aircraft to the rotating hub through any conventional means, such as a slip ring connection.

The fluid supply 22 is fluidly connected to at least one supply line 26. The supply line 26 provides pressurized fluid for actuating the flap 18. In a more preferred embodiment, there are two fluid supply lines $26_A$, $26_B$, one supply line provides fluid for actuating the flap upward and the second supply line provides fluid for actuating the flap downward. The fluid supply lines $26_A$, $26_B$ extend outward through the rotor blade from the root end 15 toward the tip end 16. The fluid supply lines $26_A$, $26_B$ function as conduits for transferring the fluid medium from the fluid supply to an actuator 28. The fluid supply lines $26_A$, $26_B$ are preferably made from high strength steel with a thin wall to reduce the weight of the supply lines. The supply lines $26_A$, $26_B$ must still be sufficiently strong to accommodate the internal pressure caused by the fluid medium. During flight, rotation of the rotor head produces a very high centrifugal pressure on the fluid in the supply lines $26_A$, $26_B$. This results in an internal pressure that can reach upwards of several thousand psi and higher. In addition to this high centrifugal pressure is the fluid pressure that the system 20 must supply to actuate the flaps.

The actuator 28 is shown mounted within the rotor blade adjacent to the flap 18. More particularly, in the illustrated embodiment, the actuator 28 is attached to the flap 18 at a flap hinge or pivot axis. Referring to FIG. 3, a cross-sectional view of the actuator is shown in more detail. The actuator 28 is a butterfly actuator that includes a housing 30 with a channel 32 formed within it. A butterfly shaft 34 is pivotally mounted within the channel 32 and includes two arms 37 that separate the channel 34 into four lobes $36_A$, $36_B$, $36_C$, $36_D$. Pivoting of the butterfly flap 34 changes the size of each lobe.

The actuator 28 also includes at least two sets of ports 38, 40 that fluidly communicate with the channel to supply fluid from the supply lines to the lobes. More particularly, the first set of ports 38 permit fluid to flow from the first fluid supply line $26_A$ through a manifold to lobes $36_A$ and $36_D$. The second set of ports 40 permit fluid to flow from the second fluid supply line $26_B$ through a manifold to lobes $36_B$ and $36_C$.

The butterfly shaft 34 is attached to a torque coupling 42 (shown in FIG. 2) which, in turn, attaches to the flap 18. The flap 18 is hinged to the rotor blade 10 so that the flap 18 can be articulated through the desired angular range (e.g., ±10°). Any conventional hinge can be used to mount the flap 18 to the rotor blade 10 which allows for pivotal movement of the flap 18. Those skilled in the art would readily appreciate the diverse hinge mechanisms that can be used in the present invention.

Referring now to FIGS. 4A through 4C, the operation of the butterfly flap is illustrated. In FIG. 4A, the flap is shown in a non-deflected position. In this position, the butterfly actuator 28 is receiving pressurized hydraulic fluid along both fluid supply lines $26_A$, $26_B$. The supply lines 26A, 26B provide an equal amount of pressurized fluid to each lobe $36_A$, $36_B$, $36_C$, $36_D$, resulting in equal and opposite loads being applied to the butterfly arms 37. As a consequence, no torque is applied to the torque coupling 42.

When it is desired to actuate the flap upwards, the first fluid supply line $26_A$ is pressurized and the second fluid supply line $26_B$ is depressurized. The pressurized fluid from the first fluid supply line $26_A$ fills lobes $36_A$ and $36_D$, increasing the pressure on the arms 37 of the butterfly shaft 34. The increased pressure causes the butterfly shaft 34 to pivot (FIG. 4B), thus producing torque on the torque coupling 42. The torque coupling 42, in turn, pivots the flap upward as shown in FIG. 4B. At the same time that lobes $36_A$ and $36_D$ are pressurized, lobes $36_B$ and $36_C$ are depressurized, allowing fluid to flow out of the actuator 28 toward the second fluid supply line $26_B$.

Similarly, when lobes $36_B$ and $36_C$ are supplied with pressurized fluid from the second supply line $26_B$, the butterfly shaft 34 pivots counter-clockwise as shown in FIG. 4C, thus producing torque on the torque coupling 42. The torque coupling 42, in turn, pivots the flap downward. At the same time that lobes $36_B$ and $36_C$ are pressurized, lobes $36_A$ and $36_D$ are depressurized, allowing fluid to flow out of the actuator 28 toward the first fluid supply line $26_A$.

It should be noted that if there are several actuators on a supply line connected to a single flap, then the actuators on each supply line are preferably actuated at the same time. If, however, more than one flap is used in the present invention, than pressurized fluid would be sent to the actuators that control the flap that is to be actuated.

Figure 5:
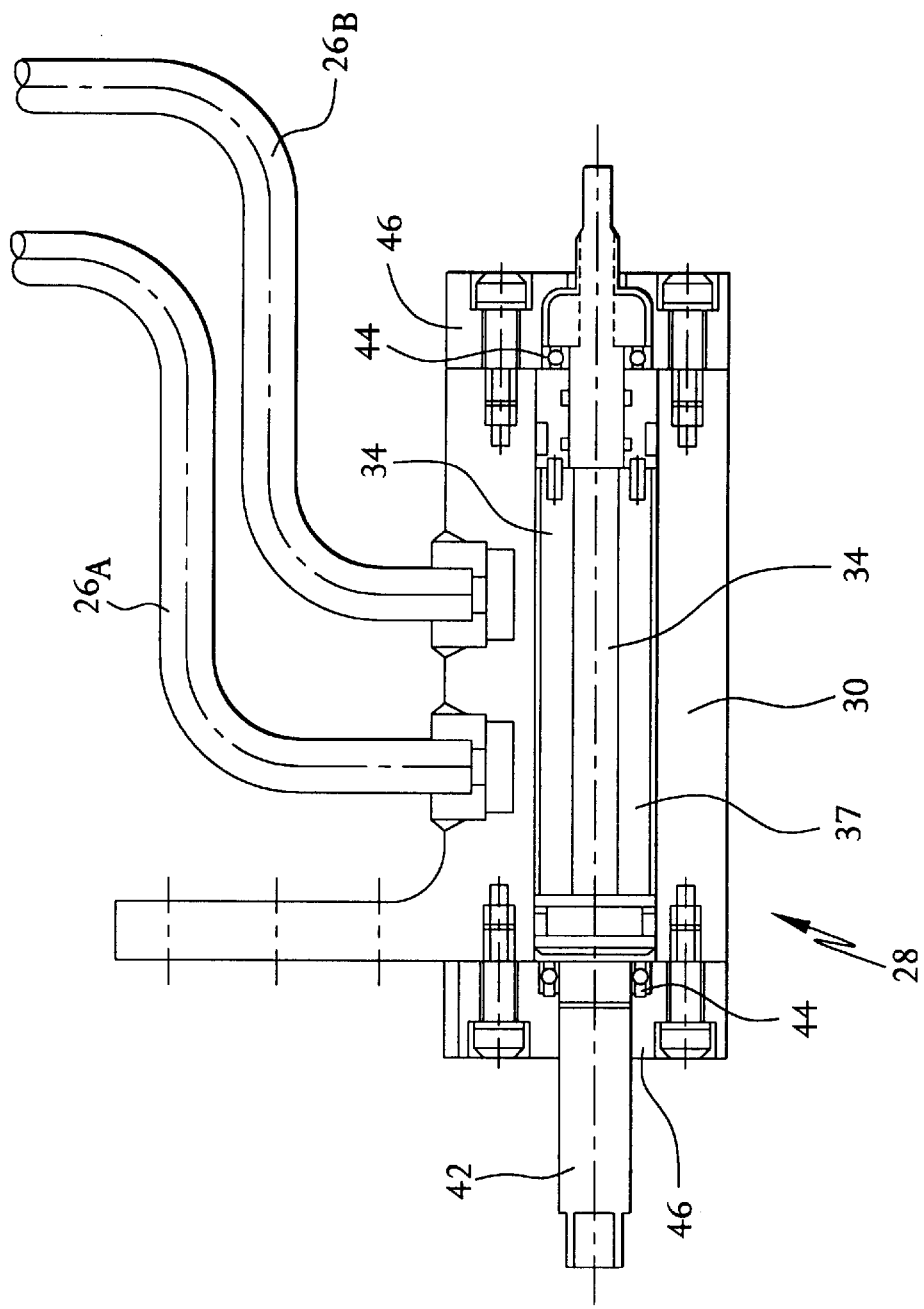
FIG. 5 illustrates one embodiment of the butterfly actuator in more detail.

FIG. 5 is a top sectional view of butterfly actuator 28 configuration which was built and tested. The butterfly shaft 34 is shown positioned within the housing 30 and attached to the torque coupling 42. The butterfly shaft 34 is mounted within bearings 44 to permit low friction rotation. The fluid supply lines $26_A$, $26_B$ are attached to the manifolds within the housing and supply pressurized fluid to the lobes. End caps 46 are mounted to either end of the housing 30 and seal the butterfly shaft 34 in the housing 30.

Figure 6:
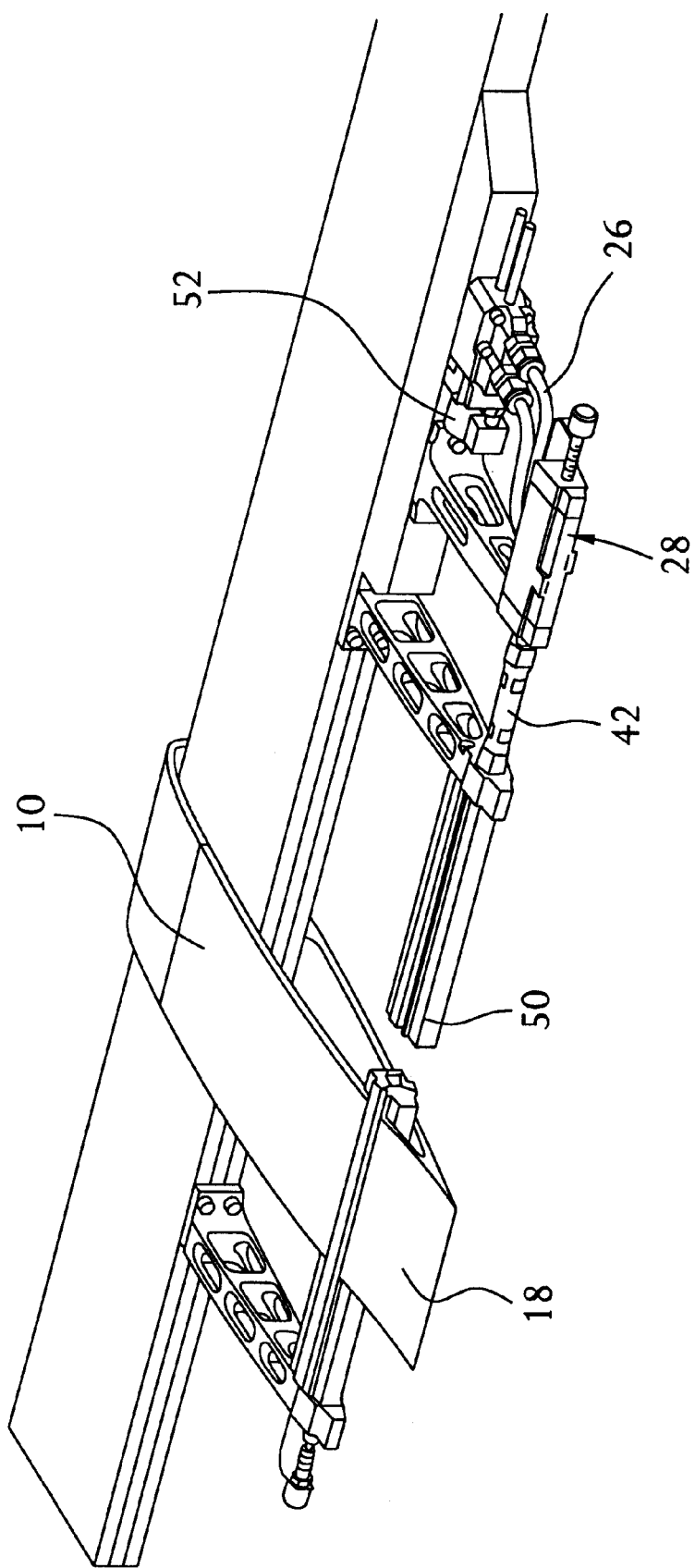
FIG. 6 is an isometric view of a test apparatus used to test a flap actuation system according to the present invention.

The actuator 28 shown in FIG. 5 was incorporated into a test apparatus illustrated in FIG. 6 to test the torque capabilities of the butterfly actuator 28 and the aerodynamic effectiveness of the active flap 18. The apparatus includes a blade segment 10 with a flap 18 attached to it through a pivotal hinge 50. The hinge 50 is attached to the torque coupling 42 which, in turn, is attached to the butterfly actuator 28. The fluid supply lines 26 supply fluid from a servovalve 52.

Figure 8:
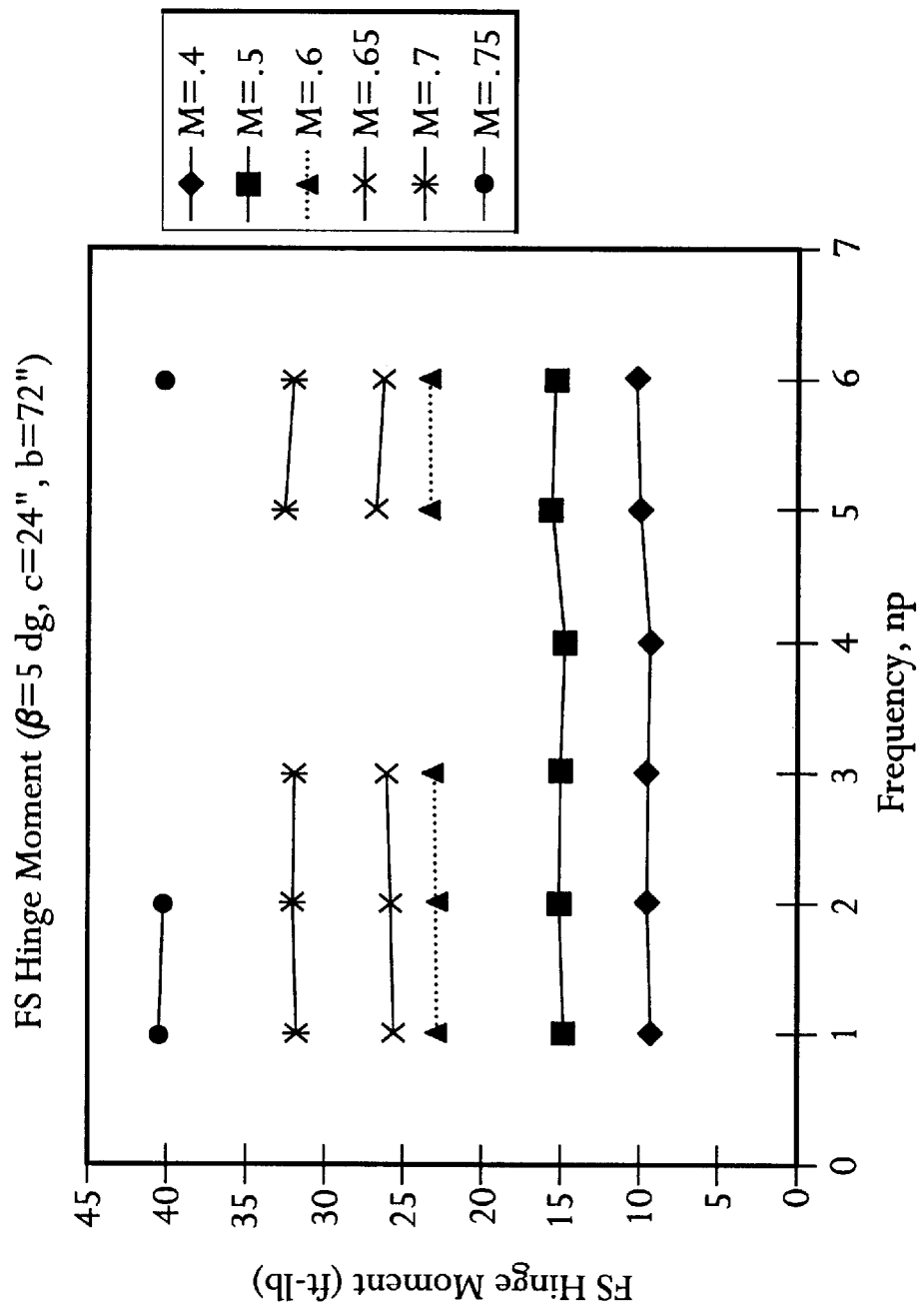
FIG. 8 is a graphical representation of test results showing the hinge moment on a full scale actuator according to the present invention.

FIG. 8 shows experimental measurements of the flap hinge moment (equal to actuator torque for 5 degree amplitude oscillations at opening frequencies from 1 per rev (5 Hz) to 6 per rev (30 Hz) on the test apparatus of FIGS. 5 and 6, tested at Mach numbers from 0.4 to 0.75 (560 mph). The results are displayed in terms of a full scale system with a 72 inch span flap on 24 inch cord blade.

Figure 7:
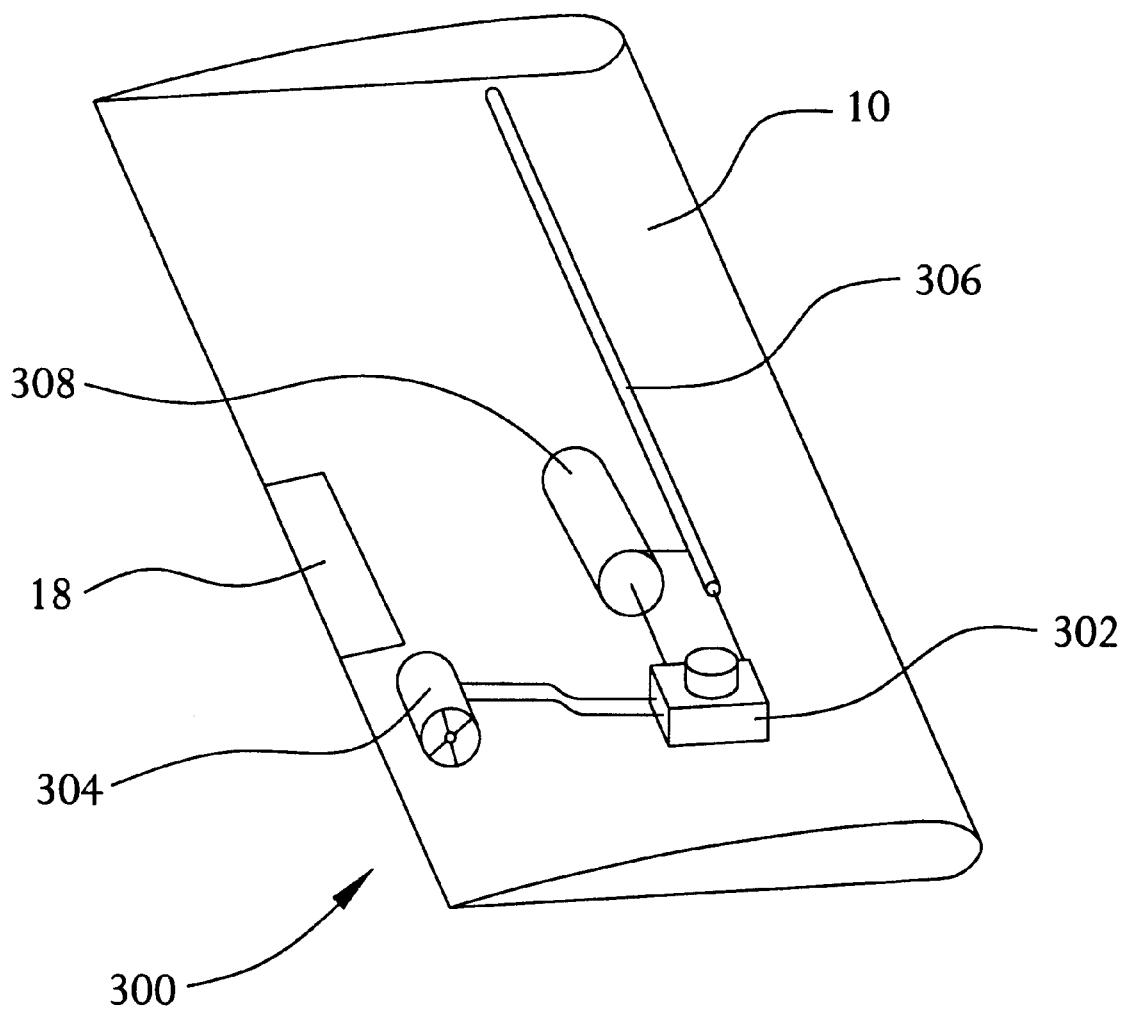
FIG. 7 is an isometric view of an alternate fluid supply system that can be used to supply pressurized fluid to the butterfly actuator.

An alternative embodiment of the flap actuation system is shown in FIG. 7. In this embodiment, the blade actuation system includes a modified fluid supply system 300. The system 300 includes a servo control valve 302 which supplies pressurized fluid to a butterfly actuator 304 as described above. The servo control valve 302 can be any conventional valve, such as a servo valve made by Moog, Inc or HR Textron, Inc. Fluid is contained within a fluid accumulator tube 306 that extends radially outward from the root to the tip. The fluid accumulator tube 306 is fluidly connected to the valve 302 and to a pump 308. The pump is also fluidly connected to the valve 302. The pump 308 supplies fluid from the valve 302 to the accumulator tube 306.

During flight, the centrifugal loads on the rotor blade cause the fluid within the accumulator to increase in pressure. Pressures of upwards of 400 psi can readily be achieved. Even higher pressures can be achieved if the fluid is pressurized before flight. The pressurized fluid is supplied to the valve 302 for use by the butterfly actuator 304 to pivot the flap 18 as described above. The pump draws hydraulic fluid out of the butterfly actuator 304 and channels it to the accumulator tube 306.

This alternate embodiment of the invention takes advantage of the natural centrifugal loads that exist. The entire fluid supply system 300 would be located within the rotor blade 10. The system eliminates the need for a fluid interface between the blade and the hub. Only electrical power needs to be supplied to operate the system. The system also requires less hydraulic fluid. However, the location of the pump with respect to the feathering axis and its axial location within the blade can create performance and weight problems that must be considered when mounting the pump.

The actuation systems described above provides novel means for actuating a flap in an active control system for a rotor blade. The butterfly configuration permits that actuator to have a low profile so that it fits within the confines of the rotor blade. The butterfly configuration also provides high torque to accommodate the high air loads.

Also, the low moment of inertia of the actuator configuration permits quick responses. The shape of the channel and the butterfly shaft provides structural stops which limit the rotation of the shaft. As such, external stops are not needed. Furthermore, the internal surfaces can be coated with a friction reducing coating to improve the actuator performance and reduce wear.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

What is claimed is:

1. An actuator for actuating a flap in an active rotor control system, the flap being mounted on a trailing edge of a helicopter rotor blade, the actuator connected to a first fluid supply line for providing a first flow of pressurized fluid from a fluid supply, and to a second fluid supply line for conveying a second flow of pressurized fluid from the fluid supply, a controller for actively driving the actuator by controlling the supplying of fluid from the fluid supply, the actuator comprising:

a housing mounted within the trailing edge of a rotor blade, the housing having a channel formed within it;
   a butterfly shaft pivotally mounted within the channel, the butterfly shaft having laterally extending arms which separate the channel into four lobes;
   a first port adapted to receive a flow of fluid from a first fluid supply line, the first port fluidly communicating with two diametrically opposed lobes in the channel; and
   a second port adapted to receive a flow of fluid from a second fluid supply line, the second port fluidly communicating with the other two diametrically opposed lobes in the channel.

2. An actuator according to claim 1 further comprising a torque coupling attached to the butterfly shaft and adapted to engage with a flap on the rotor blade such that rotation of the torque coupling produces concomitant rotation of the flap, the torque coupling rotating in a first direction when the first port receives pressurized fluid, and rotating in the opposite direction when the second port receives pressurized fluid.

3. An actuator according to claim 2 wherein the torque coupling is mounted to an end of the butterfly shaft such that rotation of the butterfly shaft about its longitudinal axis causes concomitant rotation of the torque coupling about its longitudinal axis, the torque coupling extending out of the trailing edge and attaching to the flap along its pivot axis for controlling rotation of the flap, and wherein the supplying of pressurized fluid forces the flap to pivot in a desired direction.

4. The actuator of claim 1 wherein the fluid communication between the first port and the two lobes is provided by a manifold.

5. The actuator of claim 1 wherein the fluid communication between the second port and the two lobes is provided by a manifold.

6. An actuator for actuating a flap mounted on a trailing edge of a helicopter rotor blade, the actuator to be connected to a first fluid supply line for providing a first flow of pressurized fluid from a fluid supply, and to a second fluid supply line for conveying a second flow of pressurized fluid from the fluid supply, the actuator comprising:

a housing adapted to be mounted within the rotor blade, the housing having a channel formed within it;
   a butterfly shaft pivotally mounted within the channel, the butterfly shaft having laterally extending arms which separate the channel into four lobes;
   a first port adapted to receive a flow of fluid from a first fluid supply line, the first port fluidly communicating with two diametrically opposed lobes in the channel;
   a second port adapted to receive a flow of fluid from a second fluid supply line, the second port fluidly communicating with the other two diametrically opposed lobes in the channel; and
   at least two bearings mounted within the housing which pivotally support the butterfly shaft.

7. An actuation system for actively controlling the pivoting of a flap on a helicopter rotor blade, the system comprising:

a fluid supply;
   a first fluid supply line for conveying a first flow of pressurized fluid from the fluid supply;
   a second fluid supply line for conveying a second flow of pressurized fluid from the fluid supply;
   a controller for controlling the supplying of fluid from the fluid supply along the first and second supply lines; and
   an actuator for pivoting a flap on a helicopter rotor blade, the actuator being fluidly connected to the first and second supply lines and including
      a housing mounted within the trailing edge of the rotor blade on the side of the flap, the housing having a channel formed within it,
      a butterfly shaft mounted within the channel and pivotable about a pivot axis, the butterfly shaft having laterally extending arms which separate the channel into four lobes,
      a first port fluidly communicating with the first fluid supply line and two diametrically opposed lobes in the channel, and
      a second port fluidly communicating with the second fluid supply line and the other two diametrically opposed lobes in the channel.

8. The actuation system of claim 7 further comprising a torque coupling attached to the butterfly shaft along the pivot axis and engaged with the flap such that rotation of the torque coupling produces concomitant rotation of the flap, the torque coupling rotating in the clockwise direction when the first supply fluid line is pressurized and the second supply line is depressurized, and the torque coupling rotating in the counter-clockwise direction when the second fluid supply line is pressurized and the first fluid supply line is depressurized.

9. The actuation system of claim 6 wherein the fluid communication between the first port and the two lobes is provided by a manifold.

10. The actuation system of claim 6 wherein the fluid communication between the second port and the two lobes is provided by a manifold.

11. An actuation system for pivoting a flap on a helicopter rotor blade, the system comprising:

a fluid supply;
   a first fluid supply line for conveying a first flow of pressurized fluid from the fluid supply;
   a second fluid supply line for conveying a second flow of pressurized fluid from the fluid supply; and
   an actuator for pivoting a flap on a helicopter rotor blade, the actuator being fluidly connected to the first and second supply lines and including
      a housing mounted within the rotor blade, the housing having a channel formed within it,
      a butterfly shaft pivotally mounted within the channel, the butterfly shaft having laterally extending arms which separate the channel into four lobes,
      a first port fluidly communicating with the first fluid supply line and two diametrically opposed lobes in the channel,
      a second port fluidly communicating with the second fluid supply line and the other two diametrically opposed lobes in the channel
      at least two bearings mounted within the housing which pivotally support the butterfly shaft.

12. An actuation system for actively controlling the pivoting of a flap on a helicopter rotor blade, the system comprising:
- a rotor blade having a trailing edge;
- a flap mounted adjacent to the trailing edge and pivotable about a pivot axis;
- a fluid supply;
- a first fluid supply line mounted within the rotor blade for conveying a first flow of pressurized fluid from the fluid supply;
- a second fluid supply line mounted within the rotor blade for conveying a second flow of pressurized fluid from the fluid supply;
- a controller for controlling the supplying of fluid along the first and second fluid supply lines from the fluid supply;
- an actuator mounted within the trailing edge of the rotor blade for pivoting the flap with respect to the trailing edge, the actuator being fluidly connected to the first and second supply lines and including
  - a housing mounted within the rotor blade, the housing having a channel formed within it,
  - a butterfly shaft pivotally mounted within the channel, the butterfly shaft having laterally extending arms which separate the channel into four lobes and a longitudinal pivot axis about which the shaft pivots,
  - a first port formed in the housing, the first port having at least one manifold that extends from the first fluid supply line to two diametrically opposed lobes in the channel,
  - a second port formed in the housing, the second port having at least one manifold that extends from the second fluid supply line to the other two diametrically opposed lobes in the channel, and
  - a torque coupling attached to the pivot axis of the butterfly shaft, the torque coupling extending out of the trailing edge and attaching to the flap along the flap's pivot axis such that rotation of the torque coupling produces concomitant rotation of the flap, the torque coupling rotating in the clockwise direction when the first supply fluid line is pressurized and the second fluid supply line is depressurized, and the torque coupling rotating in the counter-clockwise direction when the second fluid supply line is pressurized and the first fluid supply line is depressurized.

13. An actuation system for actuating a flap on the trailing edge of a helicopter rotor comprising:
- a fluid supply;
- a first fluid supply line for providing a first flow of pressurized fluid from a fluid supply;
- a second fluid supply line for conveying a second flow of pressurized fluid from the fluid supply;
- a controller for actively controlling the supplying of fluid from the fluid supply;
- an actuator including
  - a housing mounted within the trailing edge of a rotor blade, the housing having a channel formed within it;
  - a butterfly shaft pivotally mounted within the channel, the butterfly shaft having laterally extending arms which separate the channel into four lobes;
  - a first port adapted to receive a flow of fluid from the first fluid supply line, the first port fluidly communicating with two diametrically opposed lobes in the channel; and
  - a second port adapted to receive a flow of fluid from the second fluid supply line, the second port fluidly communicating with the other two diametrically opposed lobes in the channel;
- wherein the controller controls the supply of pressurized fluid along the first and second fluid lines to control the angle of the flap for improving the rotor blades aerodynamic performance and reducing noise generated by blade vortex interactions.

* * * * *